Figure 1:
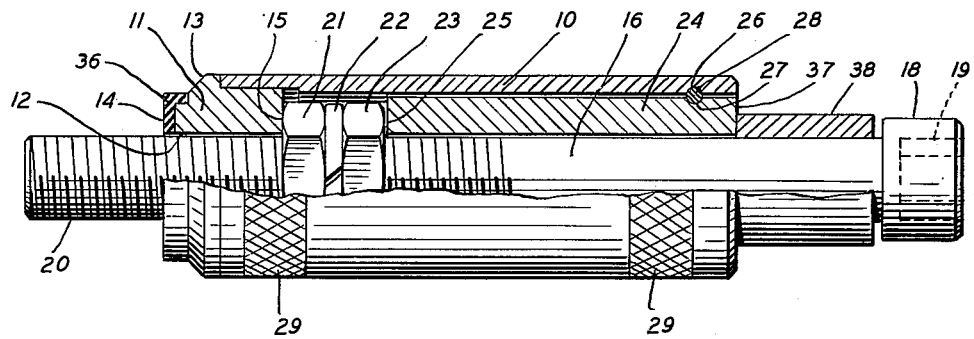

April 29, 1952  J. O. FORSTER  2,594,900
PREGAUGING TOOL FOR WIRE THREAD INSERTS
Filed April 22, 1949

INVENTOR.
JOHN O. FORSTER
BY Walter S. Pleston
ATTORNEY.

Patented Apr. 29, 1952

2,594,900

UNITED STATES PATENT OFFICE 2,594,900

PREGAUGING TOOL FOR WIRE THREAD INSERTS

John O. Forster, Long Island City, N. Y., assignor, by mesne assignments, to Heli-Coil Corporation, Long Island City, N. Y., a corporation of Delaware Application April 22, 1949, Serial No. 89,060

2 Claims. (Cl. 10—1)

The present invention relates to a tool for seating or expanding screw thread inserts consisting of wire coils, and more in particular to such inserts in which the inner thread-forming portion of the cross-section of the coiled wire has flanks converging towards the inside, i. e. towards the coil axis, and wherein said flanks may be arcuate or straight-lined. When wire coils are used as screw thread inserts in tapped holes, it frequently happens that such a coil does not correctly engage the tapped threading. In such an event, the inner threading formed by the coil does not correspond to the desired fit of a stud or bolt to be screwed into it. In particular, if the bolt or stud is intended to fit the coil threading within narrow tolerances and, therefore, a gaging tool has to be applied, proper seating of the coil must be insured before the gaging can be accomplished.

The present invention aims to provide a simple tool for seating or expanding a screw threaded insert of the mentioned type, before a bolt or stud is to be screwed into it, and, particularly, perparatory to the gaging of the coil thread.

The invention also aims to provide a tool for the indicated purpose whereby an axial force can be exerted on one of the converging cross-sectional flanks of each coil convolution, so as to create owing to the flank inclination a force component in an outwardly radial direction.

The tool according to the invention essentially comprises an outer shell-like member, an inner rod-like member rotatable in relation to the shell and having one end threaded corresponding to the desired inner thread form of a wire coil insert for which the tool is destined, and means to adjust the length of the threaded rod end projecting from the shell.

Further objects and details of the invention will be apparent from the description given hereinafter and the accompanying drawing illustrating an embodiment thereof by way of example.

Figure 3:
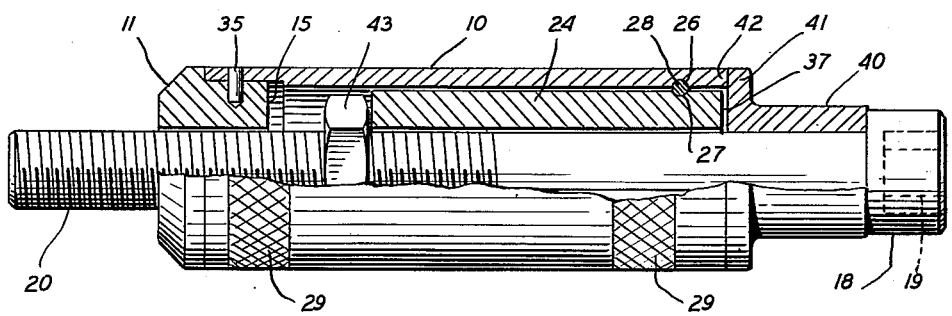
Figure 2:
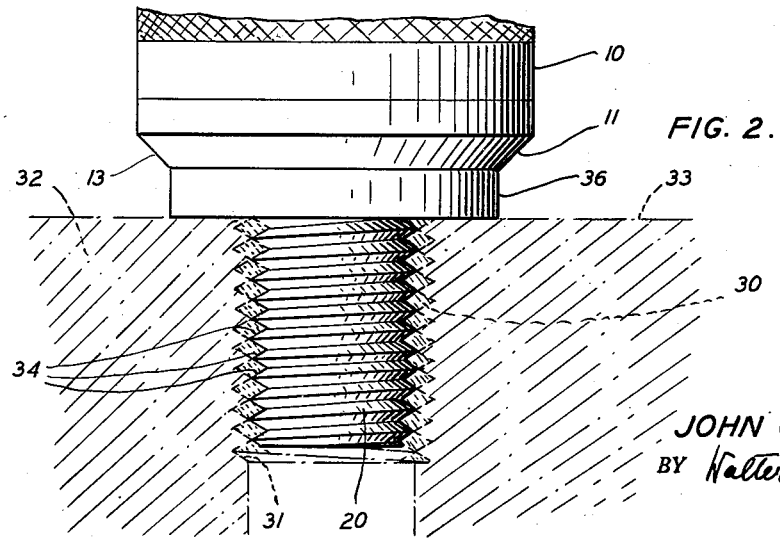

In the drawing:

Fig. 1 is a side elevation partly in section of a tool according to the invention Fig. 2 is a side elevation, at a somewhat larger scale, of a portion of the tool applied to a wire coil insert and Fig. 3 is a longitudinal cross-section, of a modified tool.

Referring now to the drawing the tool illustrated in Fig. 1 comprises an outer shell 10 in which an end piece 11 is fitted and secured by suitable means e. g. by welding or by a pin such as the pin 35 in Fig. 3. The shell and the end piece may consist of one piece. However, the two-piece design is preferred to facilitate the manufacture of the tool. The end piece 11 has an axial bore 12 and may be frustro-conical or recessed as shown at 13 in order to reduce the size of the end face 14. For reasons to be explained hereinafter a cup-like piece 36 may be fitted on the end face 14 and the recessed portion 13. This piece 36 may be of fibre or another relatively soft material. The other end face of piece 11 constitutes an inner shoulder 15. A rod-like member or bolt 16 of a length larger than that of the shell is arranged inside the latter so as to be rotatable and axially shiftable in relation to the shell. The one end 18 of the rod is shaped as a head to which a torque may be applied and which for that purpose may be provided with an inner hexagon indicated at 19. The other end 20 of the rod is projected through the bore 12 of the end piece 11 and is externally threaded over a considerable length of the rod. The threading of the rod is selected in correspondence to the desired inner threading constituted by a wire coil of a type to which the tool is intended to be applied. Means are provided to adjust the maximum length the end 20 can protrude from the end face 14 of the piece 36. For this purpose a nut 21, a locking washer 22 and a jam nut 23 are mounted on the threaded rod portion, and it will be clear, that nut 21 when bearing on shoulder 15 defines the length of the projecting rod end 20 which can be adjusted by properly setting the nuts 21, 23 and washer 22 on the threaded rod portion. Means are provided in order to prevent the parts from being separated by inadvertence. For this purpose an inner shell 24 is inserted in the first mentioned shell 10 and surrounds a portion of the rod between the head 18 and the nut 21. The inner end face 25 of shell 24 is so spaced from the shoulder 15 that the nuts 21, 23 and lock washer 22 can be accommodated there between. Shell 10 has an inner peripheral groove 26 in registry with a groove 27 in the outer periphery of shell 24, and a spring ring 28 is inserted in groove 27. Ring 28 also engages the groove 27 in the illustrated position and locks the shells in relation to each other, so, however, that under the effect of a certain force in an axial direction and owing to the resiliency of ring 28 the inner shell can be pushed or pulled out of the outer shell. Such separation of the parts will be necessary when the nuts 21 and 23 are to be adjusted on the thread of the rod end 20.

The tool can be used by screwing the threaded rod end 20 into a coil such as 30 which as shown in Fig. 2 is inserted in a tapped hole 31 of a boss member 32. During the screwing-in, the outer shell can be gripped which for this purpose may be knurled as indicated at 29, the rod being freely rotatable in relation thereto. When the end face 14 of the piece 11 or the fiber cup 36, if such cup is provided, engages the top face 33 of member 32 while a torque is applied to the head 18 in the direction to screw the rod deeper into the coil, an axial force will be set up acting on the lower flanks 34 of the coil convolutions. However, inasmuch as these flanks are inclined in relation to the coil axis and as the flanks of the threading of the rod end 20 are also inclined a wedging effect having a radial component will be created. Thereby the coil will be urged to settle deeper in the boss member threading, and simultaneously the inner threading formed by the coil will be expanded according to the desired fit of a bolt for the reception of which the coil is destined. It will be noted that the amount of expanding or pregaging the coil can be controlled by the torque or the amount of torque applied. The reaction to the mentioned axial force is set up between the outer shell of the tool and the top surface 33 of the boss 32. The mentioned cup 36 of a relatively soft material helps to protect that boss surface from injury. After the completion of the seating operation the tool can be removed by turning the rod so as to unscrew it from the coil. In order to adjust the tool for a different length of the projecting end 20, the rod together with the inner shell 24 can be removed from the outer shell 10 by a slight blow against the end 20, while the shell 10 is held. Thereupon, the nuts 21, 23 and the lock washer 22 can be adjusted and the tool can be reassembled by pushing the shell 24 back into the outer shell.

In certain instances, particularly if the tool is power driven and vibrations occur, the arrangement of the jam nut and lock washer might not be sufficiently reliable to safeguard an adjusted position of the parts. In that event, it is advisable to provide, between the rod head 18 and the end face 37 of shell 24, a spacer 38 which ensures that the end 20 of the rod cannot be projected beyond a predetermined length. It is advisable to provide for a slight clearance of the spacer ring between the head 18 and the shell face 37 as a jamming may occur should the head 18 press the spacer ring 38, shell 24, and the nuts down on seat 15. In other words the spacer ring should be merely an emergency stop in the event the adjustment nuts have moved during the use of the tool. It will be clear that each desired length of the protruding rod end requires a spacer ring 38 of corresponding height, and that adjustment can be obtained by exchanging one spacer ring for another one.

In a modified form of the tool according to the invention, the spacer ring may be made the main means for adjusting the length of the projecting end 20. This can be accomplished by a spacer ring of a diameter large enough to bear upon the outer shell rather than on the inner shell, or on both shells simultaneously. Such a modification is illustrated in Fig. 3, where the spacer ring 40 has a flange 41 bearing on the end face 42 of shell 10, while there is some clearance between the ring and the face 37 of the inner shell. In this event, only one nut 43 may be provided which serves to hold the parts together. However, the form of Fig. 3 is less recommendable than the form illustrated in Fig. 1, as it is preferable that the friction between the outer shell and inner rotating parts should take place on the smallest possible radius, in order not to transmit to the outer shell more of a torque than is unavoidable.

It will be apparent to those skilled in the art that many alterations and modifications of the structure shown are possible without departure from the essence and spirit of my invention which, for that reason, shall not be limited but by the scope of the appended claims.

I claim:

1. A tool of the type described comprising in coaxial arrangement an outer shell having an inner shoulder near one of its end faces, an inner shell extending substantially from the other end face of said outer shell inward and having an inner end face spaced from said shoulder, said shells being releasably connected to each other, a rod of greater length than said outer shell and guided in said inner shell, said rod including means to apply a torque to said rod and being threaded over a substantial part of its length according to the inner thread of a screw thread wire coil insert to which the tool is intended to be applied, said rod projecting with a portion of its threading from the shouldered end of said outer shell and with said means from the other end of said outer shell and from said inner shell, and a nut assembly in engagement with said rod threading and being located in the space between said shoulder and said inner shell, said nut assembly having abutment faces to engage said inner shoulder of said outer shell and said inner end face of said inner shell respectively.

2. A tool as claimed in claim 1, said connection of said shells comprising a resilient member connecting said shells so as to prevent an undesired axial shift of the one relatively to the other, said resilient member being yieldable to an appreciable axial force tending to separate said shells.

JOHN O. FORSTER.

REFERENCES CITED

The following references are of record in the file of this patent:

UNITED STATES PATENTS

| Number | Name | Date |
|---|---|---|
| 1,346,235 | Muller | July 13, 1920 |
| 2,316,231 | Evans | Apr. 13, 1943 |
| 2,371,622 | Hawkins | Mar. 20, 1945 |
| 2,475,040 | Mandl | July 5, 1949 |